(12) United States Patent
Higgins

(10) Patent No.: US 7,335,014 B2
(45) Date of Patent: Feb. 26, 2008

(54) COMBUSTION NOX REDUCTION METHOD

(75) Inventor: Brian S. Higgins, Raleigh, NC (US)

(73) Assignee: Mobotec USA, Inc., Orinda, CA (US)

( * ) Notice: Subject to any disclaimer, the term of this patent is extended or adjusted under 35 U.S.C. 154(b) by 73 days.

(21) Appl. No.: 10/742,260

(22) Filed: Dec. 20, 2003

(65) Prior Publication Data

US 2004/0253161 A1    Dec. 16, 2004

Related U.S. Application Data

(63) Continuation-in-part of application No. 10/461,567, filed on Jun. 13, 2003, now abandoned, and a continuation-in-part of application No. 10/459,789, filed on Jun. 12, 2003, now abandoned.

(51) Int. Cl.
*F23J 7/00* (2006.01)
*B01D 53/56* (2006.01)

(52) U.S. Cl. .............. 431/4; 431/8; 431/190; 110/348; 423/235

(58) Field of Classification Search ........... 431/4, 431/116, 350, 351, 352, 3, 10, 8, 190; 110/264, 110/265, 213, 214, 345, 348; 432/235, 239.1
See application file for complete search history.

(56) References Cited

U.S. PATENT DOCUMENTS

| | | | |
|---|---|---|---|
| 3,860,384 A * | 1/1975 | Vulliet et al. ............. | 431/4 |
| 4,208,386 A | 6/1980 | Arand et al. | |
| 4,325,924 A | 4/1982 | Arand et al. | |
| 4,672,900 A * | 6/1987 | Santalla et al. ............ | 431/9 |
| 4,927,612 A | 5/1990 | Bowers | |
| 4,992,249 A | 2/1991 | Bowers | |
| 5,057,293 A | 10/1991 | Epperly et al. | |
| 5,336,081 A * | 8/1994 | Saito et al. ............... | 431/190 |
| 5,707,596 A * | 1/1998 | Lewandowski et al. ..... | 423/235 |
| 5,809,910 A | 9/1998 | Svendssen | |
| 6,042,371 A * | 3/2000 | Mitani et al. ............. | 431/215 |
| 6,280,695 B1 | 8/2001 | Lissianski | |
| 6,357,367 B1 * | 3/2002 | Breen et al. ............... | 110/345 |

FOREIGN PATENT DOCUMENTS

| | | | |
|---|---|---|---|
| EP | 0 287 224 A2 | * | 10/1988 |
| JP | 2003-21322 | * | 1/2003 |
| WO | WO 87/03507 | * | 6/1987 |

* cited by examiner

*Primary Examiner*—Josiah C. Cocks
(74) *Attorney, Agent, or Firm*—MacCord Mason PLLC

(57) ABSTRACT

A method of extending the droplet half-life of water droplets in a combustion furnace by increasing the relative humidity in the droplets' environment; thereby reducing the evaporation rate of the water from the droplet and increasing the half-life of the droplets in the droplets' environment.

21 Claims, 5 Drawing Sheets

COMBUSTION NOX REDUCTION METHOD

Figure 1:
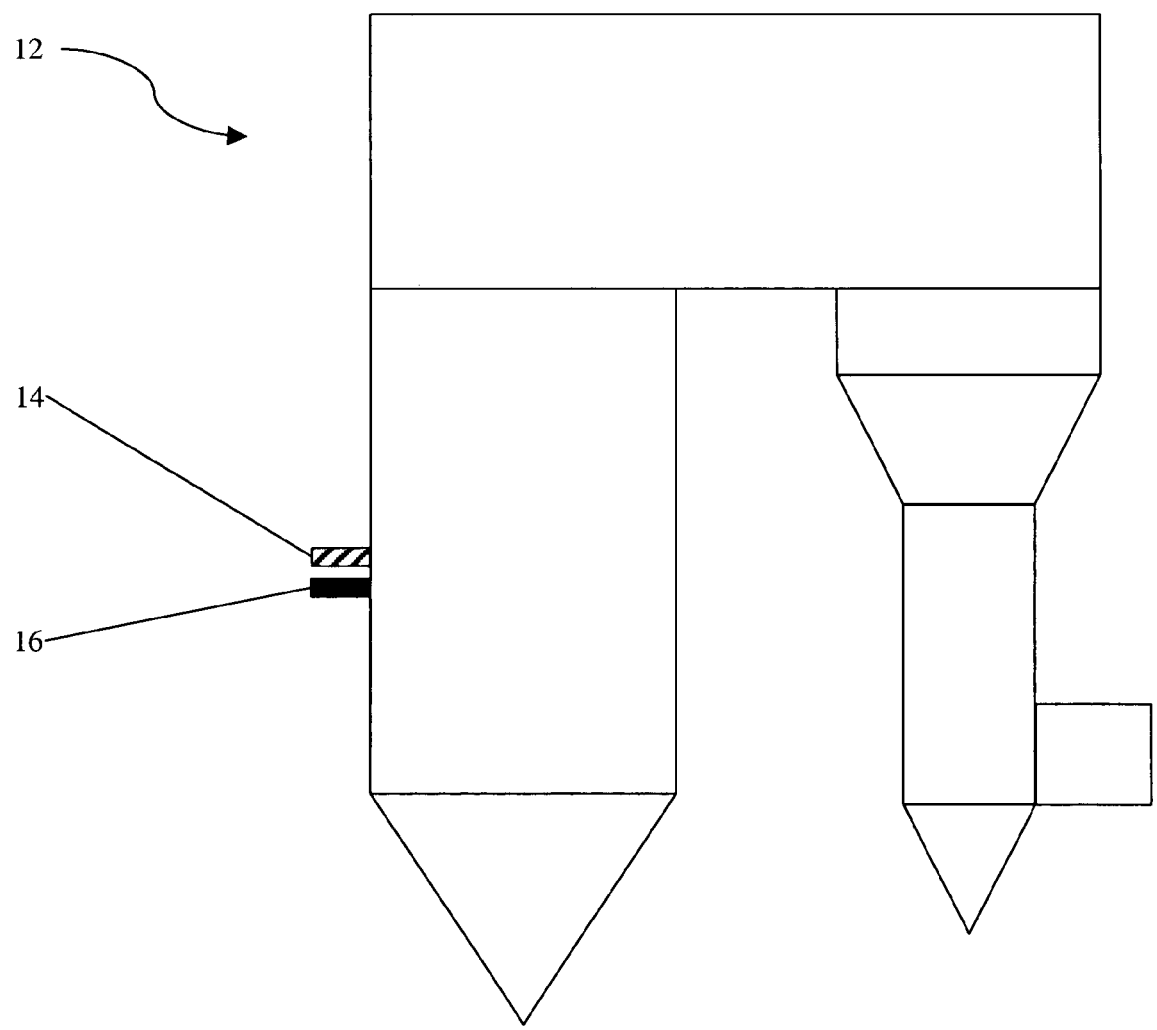

This non-provisional utility patent application claims the benefit of one or more prior filed co-pending non-provisional applications; the present application is a Continuation-In-Part of application Ser. No. 10/459,789 filed Jun. 12, 2003, now abandoned and application Ser. No. 10/461,567, filed Jun. 13, 2003, now abandoned, which are incorporated herein by reference in their entirety.

BACKGROUND OF THE INVENTION (1) Field of the Invention

The present invention relates generally to a method for reducing byproducts emissions from combustion reactions, and, more particularly, to a system and method for reducing nitrogen oxides ($NO_x$) and sulfur oxides ($SO_x$) in combustion furnaces.

(2) Description of the Prior Art

Combustion furnaces utilize injection of chemical reagents to reduce $NO_x$ and $SO_x$ and other noxious substances in the combustion effluent. These reagents are frequently dissolved in water and injected into the combustion space under pressure, forming water droplets that aid in the dispersion of the chemical reagents in the combustion gases.

In a low-relative humidity environment, the droplets will start evaporating before they have a chance to reach their boiling point. The droplets will therefore completely evaporate and make the reagent dissolved in the water droplets chemically available much sooner than the time required for the droplets to reach their boiling point. Making the reagent chemically available prematurely may lead to undesirable side reactions. In the case of $NH_3$ and $NH_3$-based reagents that are injected into combustion furnaces in order to react with $NO_x$ compounds to reduce them to elemental nitrogen, premature availability of the $NH_3$ at elevated temperatures can cause them to be oxidized themselves to $NO_x$, thereby actually raising the combustion gas $NO_x$ levels, rather than reducing them.

Prior art methods utilized large droplet sizes to delay the complete evaporation of the droplet and availability of the chemical reagent dissolved therein. However, in high-turbulence systems, droplet sizes are limited by the shear of the gases. Therefore, a need exists for a method to prevent complete evaporation of liquid droplets in a high-turbulence system until complete evaporation is desired.

SUMMARY OF THE INVENTION

The present invention is directed to a method for extending the droplet half-life of liquid droplets in an environment where the environment temperature is greater than the boiling point of the liquid solvent.

In a preferred embodiment, the method increases the relative vapor pressure of the droplet solvent in the environment, thereby reducing the evaporation rate of the solvent from the droplet and increasing the half-life of the droplets in the environment.

The present invention is further directed to a method for the use of relative humidity to prolong injected droplet half-life in a combustion furnace. The method raises the relative humidity in the droplet environment such that the droplet evaporates more slowly than in a lower-relative humidity environment. Accordingly, one aspect of the present invention is to provide a method of extending the droplet half-life of liquid droplets in their environment where the environment temperature is greater than the boiling point of the liquid solvent, including the step of increasing the relative vapor pressure of the droplet solvent in the droplet environment; thereby reducing the evaporation rate of the solvent from the droplet and increasing the half-life of the droplets in their environment.

Another aspect of the present invention is to provide a method of reducing the evaporation rate of a liquid droplet, including the step of increasing the relative vapor pressure of the droplet solvent in the droplet environment.

Still another aspect of the present invention is to provide a method of increasing the droplet half-life of water droplets in the droplet environment, including the step of increasing the relative humidity of the droplet environment through the injection of a humidifying agent; thereby reducing the evaporation rate of the droplet and increasing the half-life of the droplets in the combustion furnace.

These and other aspects of the present invention will become apparent to those skilled in the art after a reading of the following description of preferred embodiment(s) when considered with the drawings.

BRIEF DESCRIPTION OF THE DRAWINGS

FIG. 1 is a schematic diagram of a combustion furnace operated using methods according to the present invention.

FIG. 2 is a schematic diagram of the combustion furnace of FIG. 1 further including high-velocity air as a dispersing mechanism.

FIG. 3 is a schematic diagram of the combustion furnace of FIG. 3, further utilizing co-axial injectors.

FIG. 4 is a photograph of a co-axial injector used for practicing the present invention.

FIG. 5 is a photograph of a co-axial injector installed in a port of a ROFA box.

DETAILED DESCRIPTION OF PREFERRED EMBODIMENT(S)

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for describing a preferred embodiment of the invention and are not intended to limit the invention thereto.

Increase Relative Humidity and Reduce Temperature through Injection of H2O

The present invention controls the relative humidity and temperature of droplet environment such that an injected droplet does not evaporate prior to reaching the proper temperature. The present invention preferably increases the relative humidity and reduces the temperature of the combustion space proximal or prior to droplet injection in a manner that the droplets will be injected into a humidified and cooled environment. This may be accomplished by injecting the humidifying agent separately from and substantially simultaneously with the droplet injection. Alternatively or additionally, the relative humidity can be increased after the droplets are injected, sufficiently in time that the droplets do not evaporate completely prior to reaching the desired temperature and/or location.

The present invention also reduces the temperature of the droplet environment through the injection of the water. The water evaporates upon injection. This evaporation reduces the temperature of the droplet environment, which means that the inject reagent is exposed to cooler gases, even as those gases mix with hot combustion gases in the furnace.

The cooling of the droplet environment along with the simultaneous increase in the relative humidity of the droplet environment work together to ensure that the reagent reaches the appropriate temperature zone in the combustion furnace without prematurely reacting.

As best seen in FIG. 1, a combustion furnace generally described as 12 using a preferred method according to the present invention utilizes at least one humidification agent injector 16 to humidify the droplet environment such that reagent droplets injected via at least one reagent injector 14 persist until they reach the desired temperature and/or location in the combustion furnace.

Relative Humidity Ranges Necessary to Retard Droplet Evaporation

The relative humidity necessary to retard droplet evaporation until the droplet reaches the desired location in the furnace is influenced by several parameters, including the furnace load, combustion gas temperature, gas velocity, droplet size, droplet boiling point, and droplet surface tension. Therefore, the most effective relative humidity range will need to be determined empirically at each furnace and the injection rate and location(s) adjusted to operating parameters.

$H_2O$ Physical Phase

The desired humidification can be achieved by using water or steam. When using water, the water is preferably injected under pressure through an atomization nozzle to produce a fine mist, in order to more readily disperse and more rapidly evaporate, thereby humidifying the reagent droplet environment quickly and uniformly.

If using steam to humidify the droplet environment, the steam is preferably saturated steam. The steam temperature is preferably low, to increase the relative humidity/heat ratio of the injected steam and not add excessive heat to the droplet environment. Also preferably, the steam is injected well upstream of the reagent droplet injections such that the steam has a chance to cool down. Steam from the furnace cooling system can be used; the amount injected adjusted to achieve the desired result.

Injection Point Location

The humidification water or steam can be injected prior to, proximal to, and after the point of reagent droplet injection. Combinations of these injection locations can also be used. Humidification of the combustion space prior to reagent injection can be performed by injecting water or steam into the combustion furnace upstream of the reagent injection locations. Upstream injection allows the use of $H_2O$ sources that may not evaporate rapidly enough for use in proximal injection. For example, water containing large particulate that would obstruct an atomization nozzle needs to be injected through larger orifice nozzles. These large-orifice nozzles produce larger-sized droplet, which require more time to evaporate than small-size droplets. Therefore, injection of these types of humidification agents can be performed upstream to the reagent injection, allowing the humidification agent time to evaporate.

Humidification of the droplet environment can be performed by injecting water or steam into the combustion furnace in close proximity of the reagent injection locations. In one embodiment, the humidification injectors and the reagent injectors are co-axial. The co-axial configuration aligns the injection paths of the reagent and humidifying water or steam, such that reagent follows the path of the humidifying agent through the combustion space, thereby humidifying the droplet environment. This path alignment raises the probability that the reagent droplets will travel through the most humidified combustion space, thereby achieving the slowest droplet evaporation rate possible for a given amount of injected humidifying agent.

Injection of the humidifying agent after the reagent droplet injection can also be used to delay reagent droplet evaporation. This method can be employed when it is difficult to adequately inject humidifying agent prior to or proximal to the reagent injection.

Reagent Droplet

The reagent droplet has several parameters that influence its evaporation rate and half-life, including the droplet size distribution, boiling temperature, and surface tension. These need to be controlled and preferably optimized in order to achieve an adequate droplet half-life. Each of these parameters, by influencing the evaporation rate, influences the length of the droplet half-life. These parameters may accordingly be altered to change the droplet half-life.

The droplet size is important because of the decrease in surface area/volume ratio with increases in size. Lower surface area/volume ratios mean a lower heat transfer per unit mass, thereby extending the time it takes the droplet to reach its boiling temperature. Therefore, large droplets will tend to have a disproportionately longer half-life than smaller droplets.

Surface Area/Diameter Ratio

| | |
|---|---|
| Sphere Surface area = $4(\pi)r^2$ | Sphere Volume = $(4(\pi)r^3)/3$. |
| Cube Surface area = $6(L^2)$ | Cube Volume = $L^3$ | r = radius of sphere,
L = length of a side.

Droplet size distribution is important because it is desirable that all the droplets evaporate upon reaching the desired reaction temperature and/or location. Additionally, in cases where there are structures, such as catalysts, cooling fins, and the like at or immediately after the desired reaction location, it is generally undesirable for liquid droplets to hit these structures, since over time the effect of this impact is to damage the structure, especially the surface. Therefore, uniformity of droplet size distribution is important to achieve uniform results and reduce detrimental aspects possible due to variable droplet evaporation.

ROFA Shear

Figure 2:
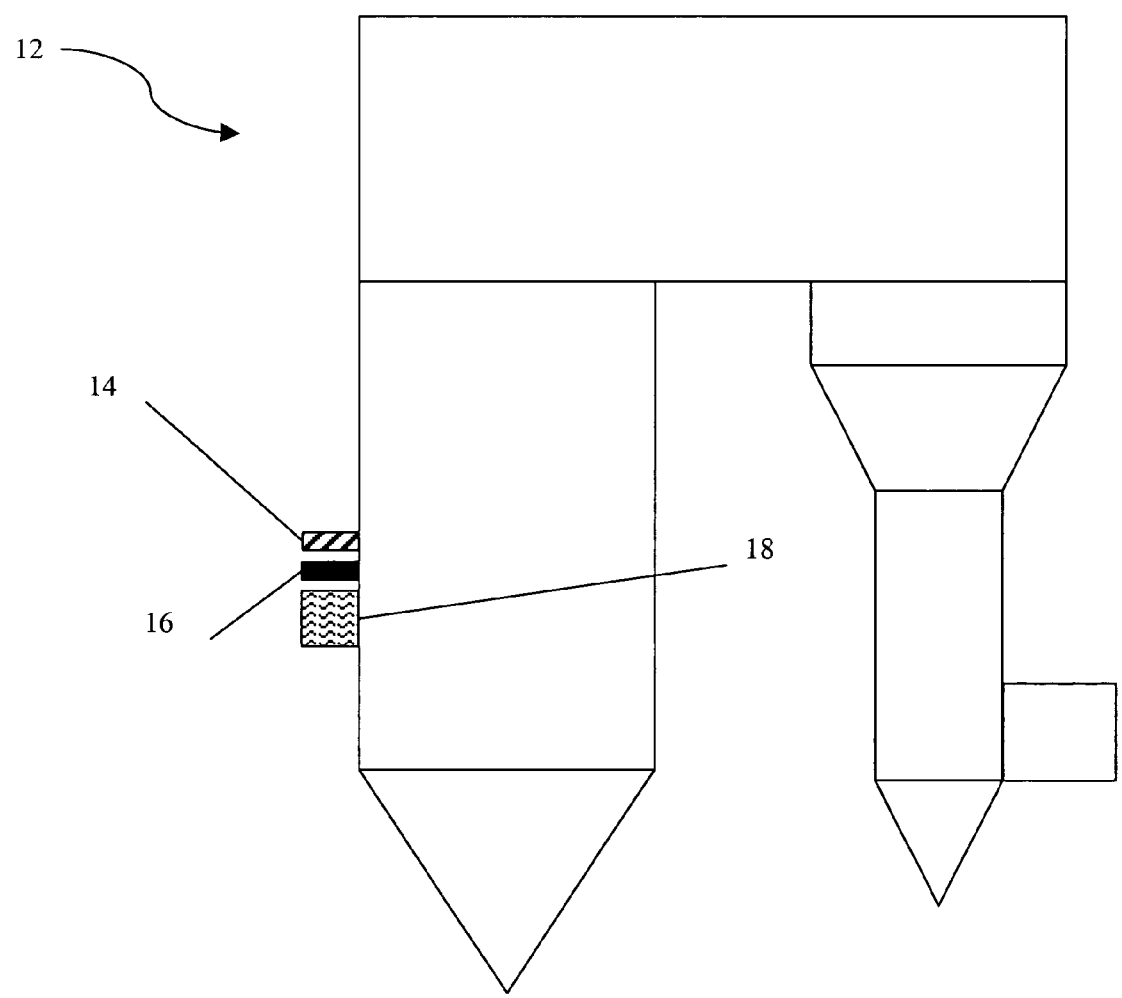
Figure 3:
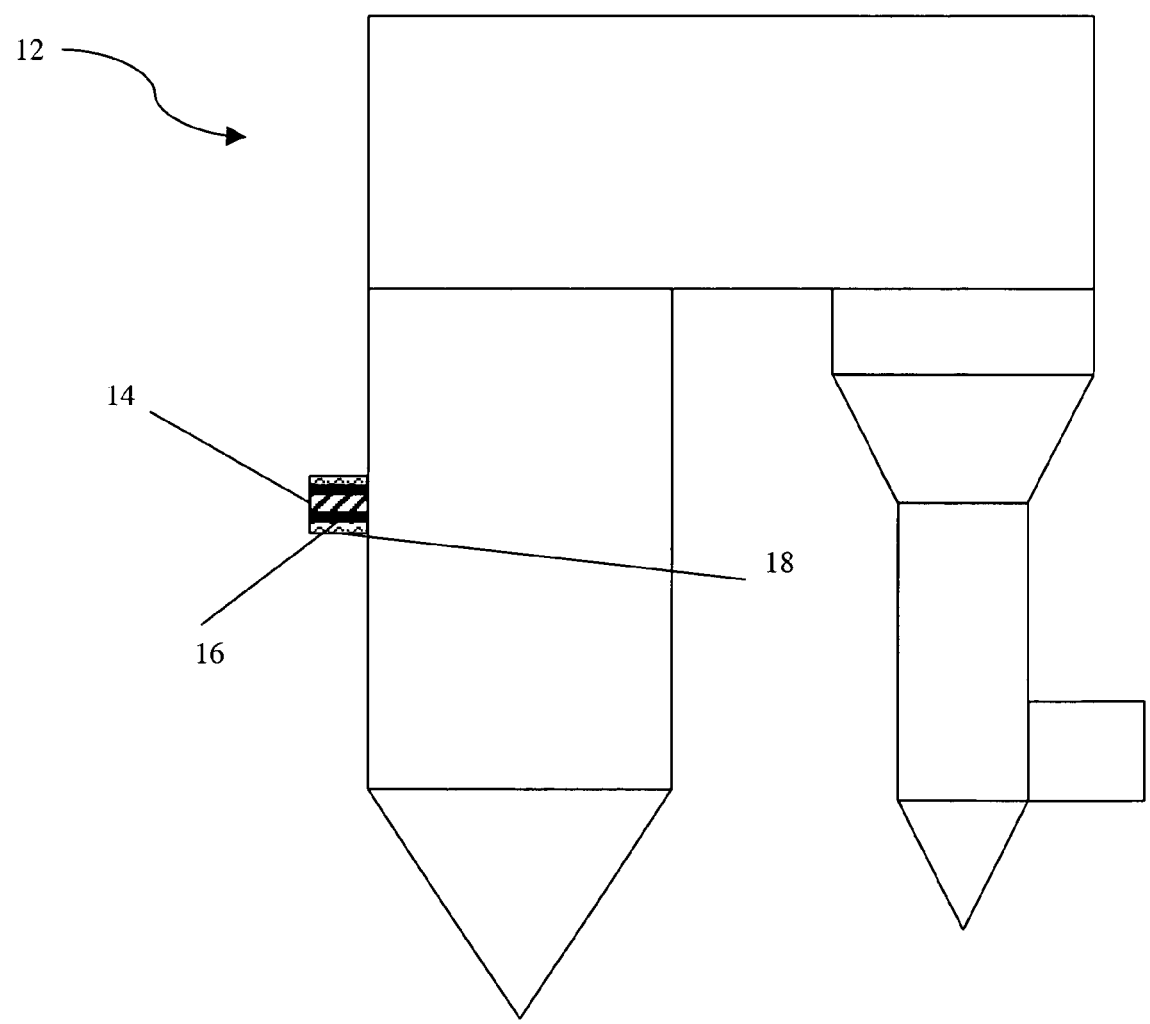

Droplet size can also be influenced by the shear forces present in the droplet environment at or near the point of injection. Maximum droplet size can be limited by the use of forceful injection of secondary air. The coordinated, reinforcing, tangential injection of high-velocity secondary air, such as described in U.S. Pat. No. 5,809,910 issued Sep. 22, 1998 to Svendssen, shears droplets injected in the path of the air. The shear disperses injected liquids and gases, and can be used to disperse humidification agents injected into the combustion furnace. The high-velocity secondary air thus disperses solutions without the need for dispersing nozzles; therefore, the reactor can use humidification agents containing particulate. This eliminates or reduces the requirement for pure reagents necessary to prevent obstruction of fine atomization orifices. For example, as shown in FIG. 2, the use of ROFA air injected through ROFA injectors 18 to disperse the injected humidification agent injected through injectors 16 allows the use of low-quality water, such as cooling-pond water, as the humidification agent in combustion furnaces, thereby reducing operating expense and improving performance by reducing orifice plugging. The ROFA injectors 18, humidification agent injectors 16, and reagent injectors 14 can be co-axial, as shown in FIG. 3.

Furthermore, because the high-velocity ROFA air enables the use of large orifice nozzles for water injection, the nozzles can be designed to work for the range of loads of a furnace. That is, a nozzle that can supply adequate water to a furnace at high loads can also be used at low loads to supply the smaller amount of water required at these loads, since the shear from the high-velocity ROFA air will disperse the water. Therefore, the present invention reduces re-tooling and changing of nozzles to accommodate changing furnace loads. This flexibility of the present invention reduces operating procedures and equipment. Moreover, the present invention allows for an immediate, on-line adjustment of operating parameters that results in more optimum operating time and less operating time outside of the desired operating conditions. The system thus can further include a reactive control system that can adjust on-line to changes in operating parameters.

Such a system, one that can be controlled while on-line is important for industries with highly variable input stocks, such as fossil fuel furnaces. Fossil fuels are highly variable in their compositions, including humidity, trace elements, acidity, and the like. These variabilities occur not only between fossil fuel stocks, but also within fossil fuel stocks. Therefore, the ability to immediately and automatically adapt to a change in the composition of an input stock is highly desirable for a system that deals with highly variable inputs, such as a combustion furnace. Thus, an embodiment of the present invention includes an automated, parameter-reactive system that includes a controller with logic connected to at least one parameter sensor for measuring at least one parameter, at least one high-velocity gas injector, at least one cooling fluid injector, and at least one reagent injector. The parameter sensor communicates the parameter value to the controller, which then adjusts the flow rates of the high-velocity gas, cooling fluid, and reagent, appropriately.

In an example system designed for the reduction of NOx in a fossil fuel combustion furnace, the measured parameter is NOx level, the high-velocity gas is secondary air, the cooling fluid is water, and the reagent is NH3 or an NH3-releasing agent. In the case of a system designed for the reduction of SOx or acids in general in a fossil fuel combustion furnace, the measured parameter is pH, the high-velocity gas is secondary air, the cooling fluid is water, and the reagent is a base, such as alkaline carbonates, such as lime, limestone; hydrated lime; quick lime; soda, trona. Other agents, such as activated charcoal, peroxides, free radicals; NH3; H2O2; and the like, may also be used.

Increased relative humidity also synergizes with the increases in solvent boiling point and surface tension seen when certain solids are dissolved in water. These two effects accentuate as relative humidity increases, thereby further increasing droplet half-life.

The droplet boiling point is influenced by the concentration of dissolved reagent. The boiling point is raised by an amount $\Delta T = m\, k_B$, where $k_B$ is the molal boiling point constant, and m is the molality of the solute. In the case of urea dissolved in water, the $k_B$=(0.51 kg ° C./mol) or approximately 0.08517° C. per % urea in solution. A 25% urea solution would boil at approximately 102.13° C.

Droplet half-life is also influenced by surface tension. Higher surface tension can reduce droplet atomization, leading to a longer half-life. Urea in solution imparts a high surface tension to the water; therefore, the droplets will tend to have a larger size and consequently a longer half-life than water alone. Additional additives can be included to the solution to further affect atomization and therefore the lifetime of the droplet.

A method according to the present invention consists of the steps of injecting a humidifying agent into a combustion furnace prior to, proximal to, and/or post reagent injection and adjusting the injection location and injection rate to maximize effectiveness of the reagent. The method can further include the steps of dispersing the humidifying agent with ROFA air. Furthermore, the ROFA air can be injected in a coordinated, reinforcing, tangential manner to more forcefully disperse the injected humidifying agent.

The present method thus controls reagent availability until desired. For example, in the case of a combustion furnace with a $NO_x$-reduction catalyst, an $NH_3$-releasing reagent in aqueous solution can be injected into the furnace and water or steam can be injection prior, proximal, and/or post reagent injection to control the evaporation rate of the reagent droplets until the droplets reach the proximity of the catalyst. In the case of a combustion furnace without a $NO_x$-reduction catalyst, an $NH_3$-releasing reagent in aqueous solution can be injected into the furnace and water or steam can be injection prior, proximal, and/or post reagent injection to control the evaporation rate of the reagent droplets until the droplets reach the reactor zone or location where reactor temperature is less than about 2100 degrees F. Preferably, the reactor temperature zone is between about 2100 degrees F. and about 1600 degrees F. More preferably, the reactor temperature zone is between about 2000 degrees F. and about 1600 degrees F. Even more preferably, the reactor temperature zone is between about 1900 degrees F. and about 1800 degrees F. Thus, the present invention provides a method of increasing the droplet half-life of water droplets in a combustion furnace having a combustion space, the water droplets composed of water and at least one reagent solute, the method comprising the steps of increasing the relative humidity of droplet environment in the furnace through the injection of a humidifying agent; and adjusting the injection location and injection rate to maximize effectiveness of the reagent solute; thereby reducing the evaporation rate of the droplet and increasing the half-life of the droplets in the droplet environment.

The method can further include the step of adjusting the humidification agent injection rate to retard reagent availability until the droplets reach the reactor location where reactor temperature is less than about 2100 degrees F. Preferably, the reactor temperature zone is between about 2100 degrees F. and about 1600 degrees F. More preferably, the reactor temperature zone is between about 2000 degrees F. and about 1600 degrees F. Even more preferably, the reactor temperature zone is between about 1900 degrees F. and about 1800 degrees F.

In cases where significant amounts of water can be added, the reagent can be injected in high-temperature locations. For example, in cases of urea solution injection to reduce NOx, the reagent can be injected in locations as high as about 2600 degrees F. In these cases, large amounts of humidification is needed.

The humidifying agent can be selected from the group consisting of liquid water, steam and combinations thereof. Furthermore, the method can include the step of dispersing the humidifying agent in the droplet environment through the injection of high-velocity secondary air; the high-velocity secondary air may be injected in a coordinated, reinforcing, tangential manner to increase turbulence in the combustion space.

The humidifying agent may be injected at an injection point prior to reagent droplet injection, proximal to reagent droplet injection, after reagent droplet injection, and combinations thereof.

For the reduction of $NO_x$, the water droplets can contain at least one $NO_x$-reducing reagent. The $NO_x$-reducing reagent can be ammonia or an $NH_3$-releasing reagent, such as urea. More specifically, the urea can be in an aqueous solution greater than about 20% w/w aqueous urea. A concentration range between about 20% and about 40% can be used and is practical and effective.

In the case of combustion furnaces with catalysts, the method can further include the step of adjusting the humidification agent injection rate to retard reagent availability until the droplets are proximal to a catalyst.

The foregoing description specifically describes utilization of the method to increase and control the evaporation rate of water-based systems; however, the same methods can also be applied toward other solvent systems, such as for other chemical syntheses and/or degradations. The solvent is also injected alone to raise the relative vapor pressure of the solvent in the chemical reactor. A chemical reactor can include any reactor in which a chemical reaction occurs, including and not limited a combustion furnace.

Thus, a method according to the present invention for of extending droplet half-life of liquid reagent droplets in a chemical reactor, the liquid droplets comprising at least one solvent and at least one solute in a droplet environment having a droplet environment temperature, wherein the droplet environment temperature is greater than the boiling point of the at least one solvent, includes the steps of: increasing the relative vapor pressure of the at least one solvent in the droplet environment by injecting the solvent into the droplet environment at a predetermined location and at a predetermined rate such that the injected solvent disperses and evaporates in the reactor; dispersing the solvent with a high-velocity gas such that the injected solvent disperses and evaporates in the chemical reactor; thereby reducing the evaporation rate of the at least one solvent from the liquid droplets and increasing the half-life of the droplets.

Further steps include adjusting the solvent injection location and injection rate to retard reagent availability until the droplets reach the desired downstream reactor location.

The high-velocity secondary air and solvent can be injected in a co-axial manner. The high-velocity secondary air can also be injected in a coordinated, reinforcing, tangential manner.

For a combustion furnace, a method for increasing the droplet half-life of water reagent droplets in a droplet environment having a droplet environment temperature within a combustion furnace having a combustion space, the water droplets comprising water and at least one reagent solute, the method steps include: increasing the relative humidity of the droplets environment in the furnace through the injection of a humidifying agent; adjusting the injection location and injection rate of the humidifying agent to improve effectiveness of the reagent solute by increasing the efficiency of a reaction of the reagent within the furnace; thereby reducing the evaporation rate of the droplet and increasing the half-life of the droplets in the combustion furnace.

A method for reducing NOx in a combustion furnace includes the steps of: injecting water into the combustion space; injecting high-velocity air in the path of the injected water to disperse and evaporate the water; thereby humidifying and cooling a space in the combustion furnace to form a humidified space; injecting a NOx-reducing agent dissolved in water into the humidified space in the combustion furnace in a manner to form droplets, the droplets having an droplet environment and the droplet environment having a droplet environment temperature; wherein the humidification and cooling of the droplet environment extends the droplet half-life in the combustion furnace to permit the reagent to reach the desired reaction location in the furnace; thereby reducing the NOx emissions of the combustion furnace.

The present invention can also be used to inject cooling liquids or gases to cool the combustion or reactor space such that reagents that are insoluble or not readily soluble and/or are to be immediately activated. In this embodiment, the present invention includes injecting a reagent with a liquid coolant and a high-velocity gas in a manner that promotes simultaneous cooling of the gas and enhanced mixing of the reagent with the gas through the increased mass flow of the gas/coolant mixture. The purpose of the cooling liquid is to reduce the temperature such that the reagent is not denatured or otherwise destroyed by the high temperatures present at high loads.

For example, a method for reducing SOx in a combustion furnace includes the method steps of injecting water into the combustion space; injecting high-velocity air in the path of the injected water to disperse and evaporate the water; thereby humidifying and cooling a space in the combustion furnace to provide a humidified and cooled space; injecting a SOx-reducing agent dissolved in water into the humidified space in the combustion furnace in a manner to form droplets, the droplets having a droplet environment. The humidification and cooling of the droplet environment extends the droplet half-life in the combustion furnace to permit the reagent to reach the desired reaction location in the furnace; thereby reducing the SOx emissions of the combustion furnace.

The present invention uses the high-velocity ROFA air shear to disperse liquids injected in the path of the ROFA air; therefore, the present embodiment enables the use of nozzles that can function for the entire range of loads of a furnace. The reason for this being that a nozzle that can supply adequate water to a furnace at high loads can also be used at low loads to supply the smaller amount of water required at these loads, since the shear from the high-velocity ROFA air will shear the large droplets formed at the low-volume, low pressure injection rate into smaller droplets and thus disperse the water effectively. Therefore, the present invention reduces re-tooling and changing of nozzles to accommodate changing furnace loads. This flexibility of the present invention reduces operating procedures and equipment. Moreover, the present invention allows for an immediate, on-line adjustment of operating parameters that results in more optimum operating time and less operating time outside of the desired operating conditions.

The system thus can further include an automated control system that can adjust on-line to changes in operating parameters. In an example system designed for the reduction of NOx in a fossil fuel combustion furnace, the at least one measured parameter is NOx level, the high-velocity gas is secondary air, the cooling fluid is water, and the reagent is NH3 or an NH3-releasing agent. In the case of a system designed for the reduction of SOx or acids in general in a fossil fuel combustion furnace, one measured parameter is pH, the high-velocity gas is secondary air, the cooling fluid is water, and the reagent is a base, such as alkaline carbonates, such as lime, limestone; hydrated lime; quick lime; soda, trona. Other agents, such as activated charcoal, peroxides, free radicals; NH3; H2O2; and the like, may also be used. The present system can thus be use in a variety of places in a combustion furnace, including, but not limited to, the convection pass of the boiler, the back pass of the boiler, prior to the SCR catalyst, after the SCR catalyst, and combinations of these places.

Moreover, when multiple systems are used, they can be in communication such that the most desired parameter(s) is/are minimized in the final effluent. For example, in cases where it is desired to minimize total acid output of a combustion furnace, regardless of the causative chemical species, a multiplicity of subsystems, which can include NOx and SOx reducing systems, can be coordinated by a master controller to find the combination of reagent inputs to reduce the total acid output, rather than each subsystem attempting to minimize the output of the parameter it is sensing.

Furthermore, in cases where more than one combination of inputs is possible to achieve the minimum by-product output and it is desired to economically minimize total by-product output, the multiplicity of subsystems can be controlled by the master controller to select the combination of reagent input rates that provides the most economical reduction of by-product. For example, in the case where the desired by-product to be reduced is total acid output of a combustion furnace, regardless of the causative chemical species, a multiplicity of subsystems that can include NOx and SOx reducing systems can be coordinated by a master controller to find the most economical combination of reagent inputs to reduce the total acid output, rather than each subsystem attempting to minimize the output of the parameter it is sensing.

Certain modifications and improvements will occur to those skilled in the art upon a reading of the foregoing description. All modifications and improvements have been deleted herein for the sake of conciseness and readability but are properly within the scope of the following claims.

EXAMPLE(S)

This section outlines an example of a system operated using the present invention, not necessarily optimized, but illustrative of a humidification method according to the present invention.

A trial of the present invention in specific regard to $NO_x$ reduction was performed at an operating power station. The trial included a test of the humidification method and devices. The power station was a mid-sized four corner fired unit (also known as a tangentially-fired or t-fired unit) capable of producing 79 MW at maximum load. At this facility there are two units that share a common stack, and only one of the units was treated. The NOx measurements were taken in the stack. Therefore, analysis of the data must take into account the NOx production and load from each unit simultaneously.

The test was performed with a 40% w/w solution of urea. The urea was not diluted. The source of water for the humidification/cooling was potable water from the plant water tank. Both the urea and the humidification/cooling water were pumped through conventional pump skids into the control cabinets.

Figure 4:
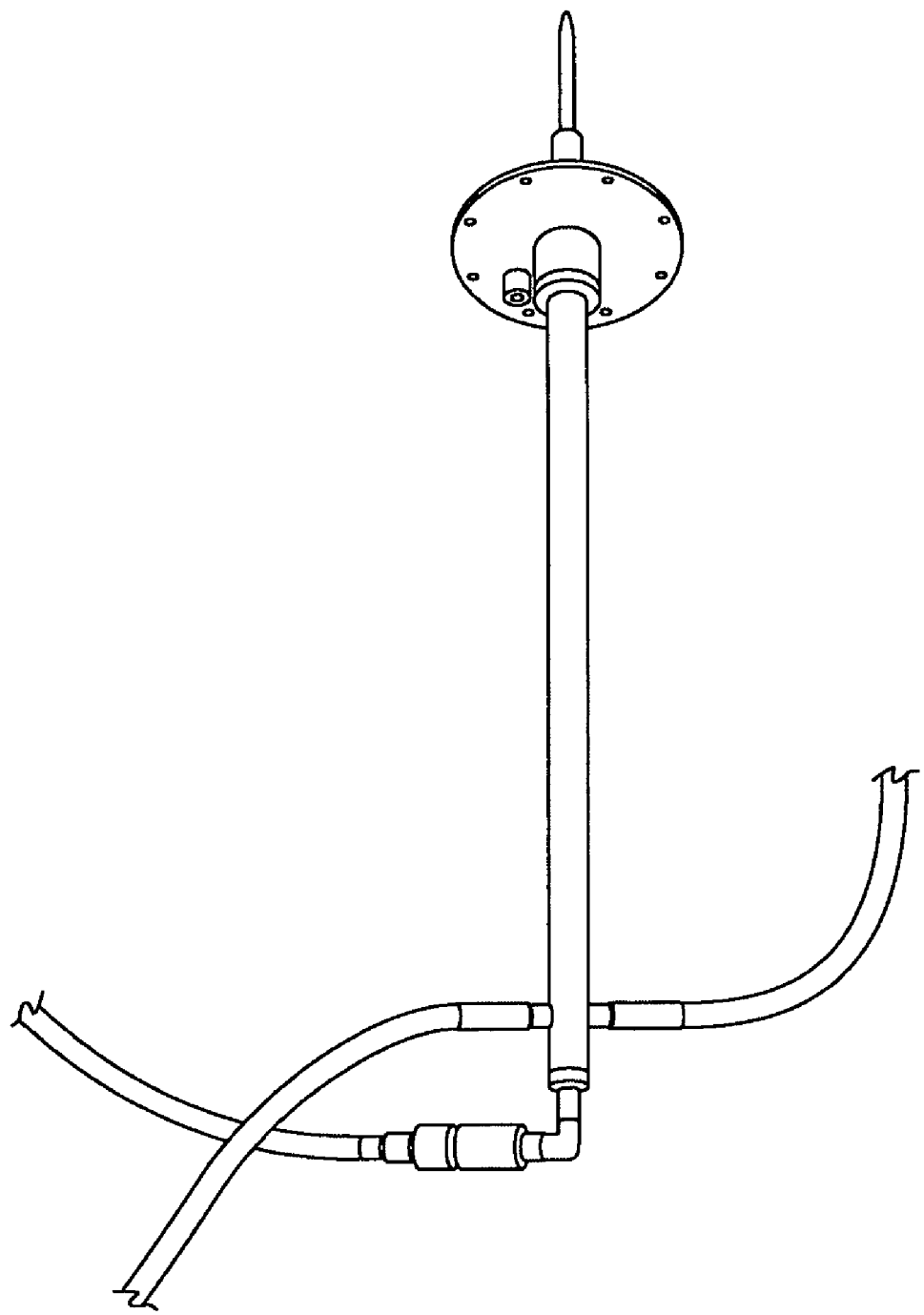
Figure 5:
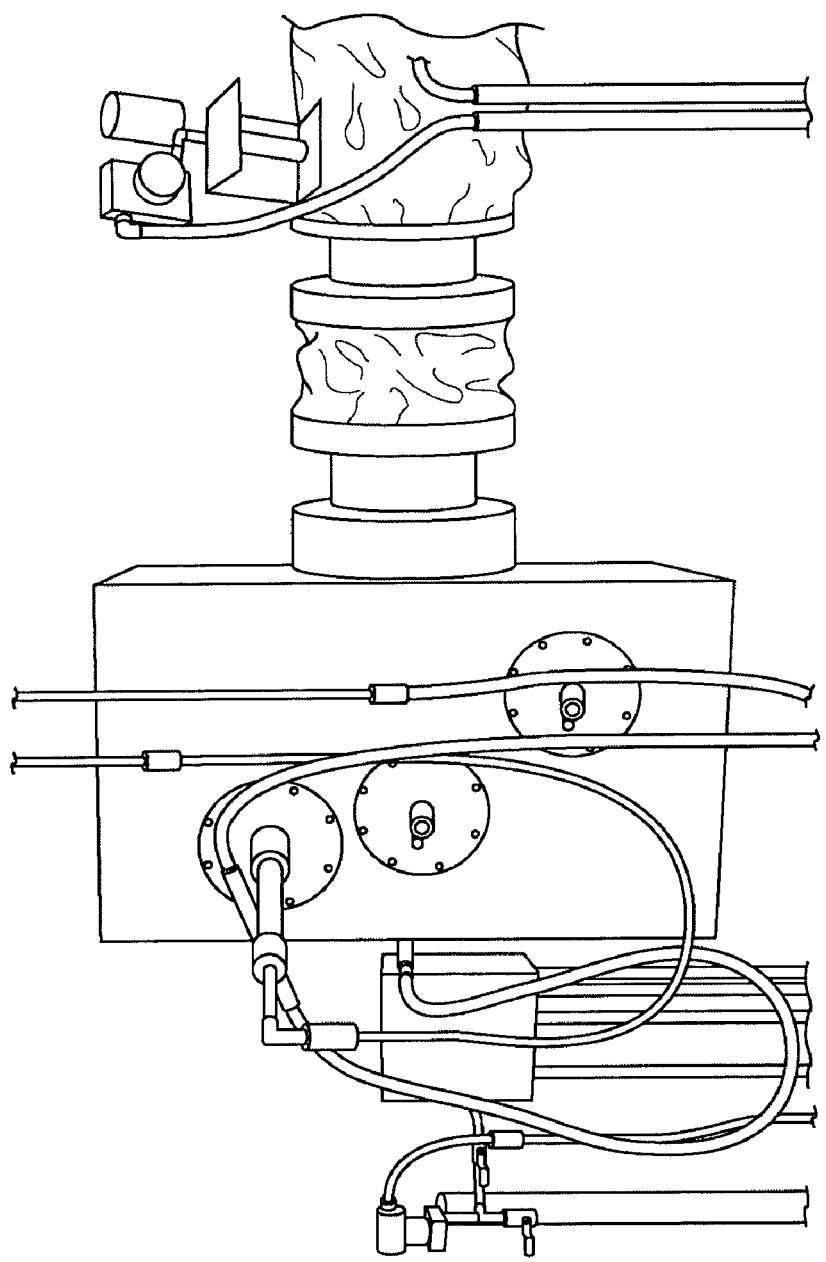

The devices, as shown in FIG. 4, were hooked up to the urea, humidification/cooling water and air lines. The 40% w/w solution of urea entered through the SS braided center lance connection, humidification/cooling water through the left hand hose and air through the right hand hose. The lances were installed in the upper ports (RR and RL) of the two upper boxes, as shown in FIG. 5.

The unit load was 47 MW at Unit 1 and 72 MW at Unit 2. The reading from a common stack CEM meter was used to determine if NOx reductions occurred during the trial. Base NOx levels were 0.427 lb/MMBtu with Unit 1 at 47 MW and Unit 2 at 72 MW.

Four tests were run. The first was with the unit uncontrolled (baseline). The second was with the ROFA system in operation, but with no urea injection or humidification. The third was with the urea injection and with humidification through one nozzle/lance only (RR). The fourth was with urea injection and with humidification through two nozzles/lances (RR and RL). The results are presented in the following table.

TABLE 1

| | Time | NOx (lb/MMBtu) | Unit 1 Load (MW) | Unit 2 Load (MW) |
|---|---|---|---|---|
| Uncontrolled | 11:00 | .427 | 47 | 72 |
| ROFA | 12:15 | .362 | 47 | 72 |
| Rotamix (RR lance only) | 13:17 | .300 | 47 | 72 |
| Rotamix (RR and RL lances) | 14:20 | .248 | 46 | 72 |

To understand the affect of the humidification on Unit 1, we need to correct for the emissions from Unit 2. From the EPA database, we can assume that the Unit 2 NOx emissions were 0.37 lb MMBtu at 72 MW. From this we can calculate the NOx emissions from Unit 1. These estimates are shown in following table. Of note, when one lance is in service, the total NOx reduction increases from 33% with ROFA only to 63% with ROFA/Rotamix. The addition of another lance further increases NOx reduction to 88%. Reduction from Rotamix over ROFA is 83%, using both lances.

TABLE 2

| | Time | Estimated Unit 1 NOx (lb/MMBtu) | Reduction from Uncontrolled | Reduction from ROFA |
|---|---|---|---|---|
| Uncontrolled | 11:00 | 0.52 | — | — |
| ROFA | 12:15 | 0.35 | 33% | — |
| Rotamix (RR lance only) | 13:17 | 0.19 | 63% | 46% |
| Rotamix (RR and RL lances) | 14:20 | 0.06 | 88% | 83% |

The invention claimed is:

1. A method of increasing the droplet half-life of water reagent droplets in a stream injected into a droplet environment having a droplet environment temperature within a combustion furnace having a combustion space, the water reagent droplets comprising water and at least one reagent solute, the method comprising the steps of:

a) increasing the relative humidity of the droplet environment in the furnace through the injection of a liquid humidifying agent in a separate stream into the combustion space wherein said humidifying injection is performed substantially simultaneously with the droplet injection; and b) adjusting the injection location and injection rate of the humidifying agent to improve effectiveness of the reagent solute by increasing the efficiency of a reaction of the reagent within the furnace to reduce the evaporation rate of the droplets and increase the half-life of the droplets in the combustion furnace.

2. The method of claim 1, further including the step of adjusting the humidification agent injection rate to retard reagent availability until the droplets reach the furnace location where the furnace temperature is between about 1600 degrees F. (about 871 degrees C.) and about 2600 degrees F. (about 1427 degrees C).

3. The method of claim 1, wherein the humidifying agent includes water.

4. The method of claim 1, further including the step of dispersing the humidifying agent in the droplet environment through the injection of high-velocity secondary air.

5. The method of claim 4, wherein the high-velocity secondary air and humidifying agent are injected in a co-axial manner.

6. The method of claim 4, wherein the high-velocity secondary air is injected in a coordinated, reinforcing, tangential manner.

7. The method of claim 1, wherein the humidifying agent is injected at an injection point selected from the group consisting of prior to reagent droplet injection, proximal to reagent droplet injection, after reagent droplet injection, and combinations thereof.

8. The method of claim 1, wherein the water reagent droplets contain at least one $NO_x$-reducing reagent.

9. The method of claim 8, wherein the $NO_x$-reducing reagent is selected from the group consisting of $NH_3$-releasing reagents.

10. The method of claim 9, wherein the $NO_x$-reducing reagent is urea.

11. The method of claim 10, wherein the urea is greater than about 20% aqueous urea w/w.

12. The method of claim 1, wherein the water droplets contain at least one $SO_x$-reducing reagent.

13. The method of claim 12, wherein the $SO_x$-reducing reagent is selected from the group consisting of bases.

14. The method of claim 13, wherein the $SO_x$-reducing reagent is selected from the group consisting of alkaline carbonates, such as lime, limestone; hydrated lime; quick lime; soda, trona and combinations thereof.

15. The method of claim 1, further including the step of adjusting the humidification agent injection rate to retard reagent availability until the droplets are proximal to a catalyst.

16. A method for reducing NOx in a combustion furnace, the method steps comprising:
a) injecting water into a combustion space of the combustion furnace in a liquid stream;
b) injecting high-velocity air in the path of the injected water to disperse and evaporate the water; thereby humidifying and cooling a space in the combustion furnace to form a humidified space; and
c) injecting a NOx-reducing agent dissolved in water in a separate stream into the humidified space in the combustion furnace substantially simultaneously with said water injection in a manner to form droplets, the droplets having an droplet environment and the droplet environment having a droplet environment temperature; wherein the humidification and cooling of the droplet environment extends the droplet half-life in the combustion furnace to permit the reagent to reach the desired reaction location in the furnace; thereby reducing the NOx emissions of the combustion furnace.

17. A method for reducing SOx in a combustion furnace, the method steps comprising:
a) injecting water into a combustion space of the combustion furnace in a liquid stream;
b) injecting high-velocity air in the path of the injected water to disperse and evaporate the water; thereby humidifying and cooling a space in the combustion furnace to provide a humidified and cooled space; and
c) injecting a SOx-reducing agent dissolved in water in a separate stream into the humidified space in the combustion furnace substantially simultaneously with said water injection in a manner to form droplets, the droplets having a droplet environment; wherein the humidification and cooling of the droplet environment extends the droplet half-life in the combustion furnace to permit the reagent to reach the desired reaction location in the furnace; thereby reducing the SOx emissions of the combustion furnace.

18. A method of increasing the half-life of water reagent droplets in a droplet environment having a temperature in a combustion furnace comprising the steps of:
a) injecting the water reagent droplets into a droplet environment from a reagent stream;
b) injecting a liquid humidifying agent into the combustion furnace from a separate, reagent free stream substantially simultaneously with said water reagent droplet injection to increase the relative humidity and reduce the temperature of the droplet environment in the furnace; and
c) adjusting an injection location and an injection rate of the humidifying agent to improve effectiveness of the reagent solute by increasing the half-life of the droplets in the combustion furnace.

19. The method of claim 18 further including changing the injection rate of the liquid humidifying agent to accommodate changing furnace loads.

20. The method of claim 19 further including the step of dispersing the humidifying agent in the droplet environment through the injection of high-velocity secondary air.

21. The method of claim 18 further comprising retarding reagent availability until the water reagent droplets reach a furnace location where the temperature is between about 1600 degrees F. (about 871 degrees C.) and about 2600 degrees F. (about 1427 degrees C.).

* * * * *